Figure 1:
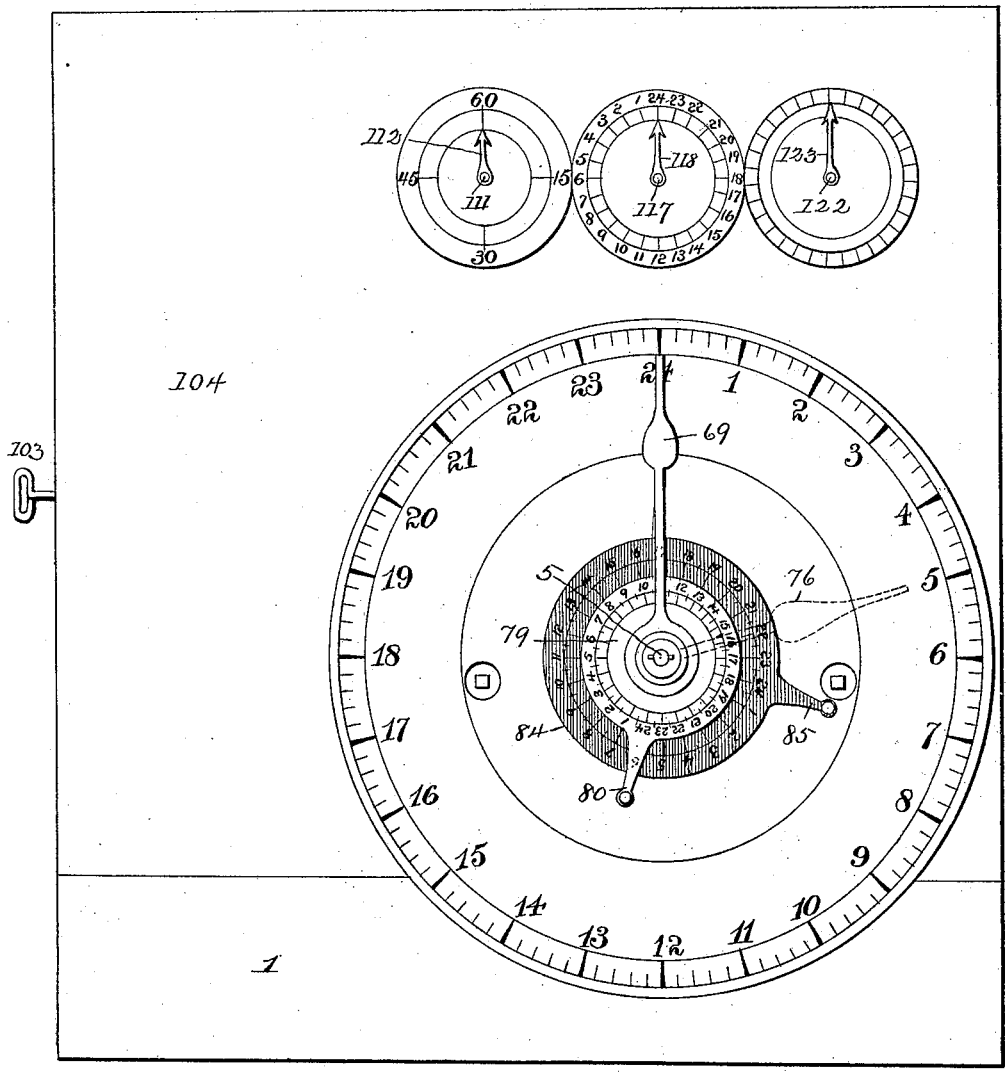

(No Model.) 7 Sheets—Sheet 1.

J. F. McLAUGHLIN.
ELECTRIC TIME SWITCH.

No. 546,674. Patented Sept. 24, 1895.

Witnesses
J. B. McGirr.
F. T. Chapman

Inventor,
James F. McLaughlin,
By Joseph Lyons
Attorney (No Model.) 7 Sheets—Sheet 2.

J. F. McLAUGHLIN.
ELECTRIC TIME SWITCH.

No. 546,674. Patented Sept. 24, 1895.

Witnesses
J. B. McGirr.
F. T. Chapman.

Inventor,
James F. McLaughlin,
By Joseph Lyons.
Attorney (No Model.)

J. F. McLAUGHLIN.
ELECTRIC TIME SWITCH.

No. 546,674.

7 Sheets—Sheet 3.

Patented Sept. 24, 1895.

Witnesses
J. B. McGivr.
F. T. Chapman

Inventor,
James F. McLaughlin,
By Joseph Lyons.
Attorney (No Model.) 7 Sheets—Sheet 4.

J. F. McLAUGHLIN.
ELECTRIC TIME SWITCH.

No. 546,674. Patented Sept. 24, 1895.

Witnesses
J. B. McGirr.
F. T. Chapman

Inventor,
James F. McLaughlin
By Joseph Lyons,
Attorney (No Model.) 7 Sheets—Sheet 5.
J. F. McLAUGHLIN.
ELECTRIC TIME SWITCH.
No. 546,674. Patented Sept. 24, 1895.

Witnesses
J. B. McGirr.
F. T. Chapman.

Inventor,
James F. McLaughlin,
By Joseph Lyons,
Attorney (No Model.) 7 Sheets—Sheet 6.

J. F. McLAUGHLIN.
ELECTRIC TIME SWITCH.

No. 546,674. Patented Sept. 24, 1895.

Witnesses
J. B. McGirr.
F. T. Chapman.

Inventor,
James F. McLaughlin,
By Joseph Lyons,
Attorney (No Model.) 7 Sheets—Sheet 7.

J. F. McLAUGHLIN.
ELECTRIC TIME SWITCH.

No. 546,674. Patented Sept. 24, 1895.

Witnesses
J. B. McGirr.
F. T. Chapman.

Inventor,
James F. McLaughlin,
By Joseph Lyons,
Attorney

UNITED STATES PATENT OFFICE.

JAMES F. McLAUGHLIN, OF PHILADELPHIA, PENNSYLVANIA, ASSIGNOR TO JAMES W. DIFENDERFER, OF SAME PLACE, AND THEODORE H. GEHLY, OF YORK, PENNSYLVANIA.

ELECTRIC TIME-SWITCH.

SPECIFICATION forming part of Letters Patent No. 546,674, dated September 24, 1895.

Application filed April 11, 1893. Serial No. 469,908. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Automatic Electric Time-Switches, of which the following is a specification.

This invention has reference to improvements in automatic electric time-switches for controlling electric circuits, more especially those including electric lamps used for display or advertising purposes, which lamps are usually kept burning after business hours. Switches have heretofore been proposed for the purpose of cutting such lamps into circuit automatically at a predetermined time, and then again automatically cutting them out at a later time, and thereby saving the consumer the annoyance and inconvenience of going personally or sending another person to the point of consumption for establishing and breaking the circuit. Such automatic switches, however, were so constructed that they had to be set daily in order to operate at all. This objectionable feature is entirely overcome by the present invention, by which the switch if once set will operate to cut the lamps in and out of circuit at the times for which the apparatus has been set without other attention than to occasionally wind the actuating-springs of the driving mechanisms. In addition thereto my invention comprises a meter for registering the time during which current is consumed, which meter is thrown into and out of operation simultaneously with the establishing and breaking of the circuit to the lamps controlled by the switch. All this will more fully appear from the following detail description, taken in connection with the accompanying drawings, in which—

Figure 2:
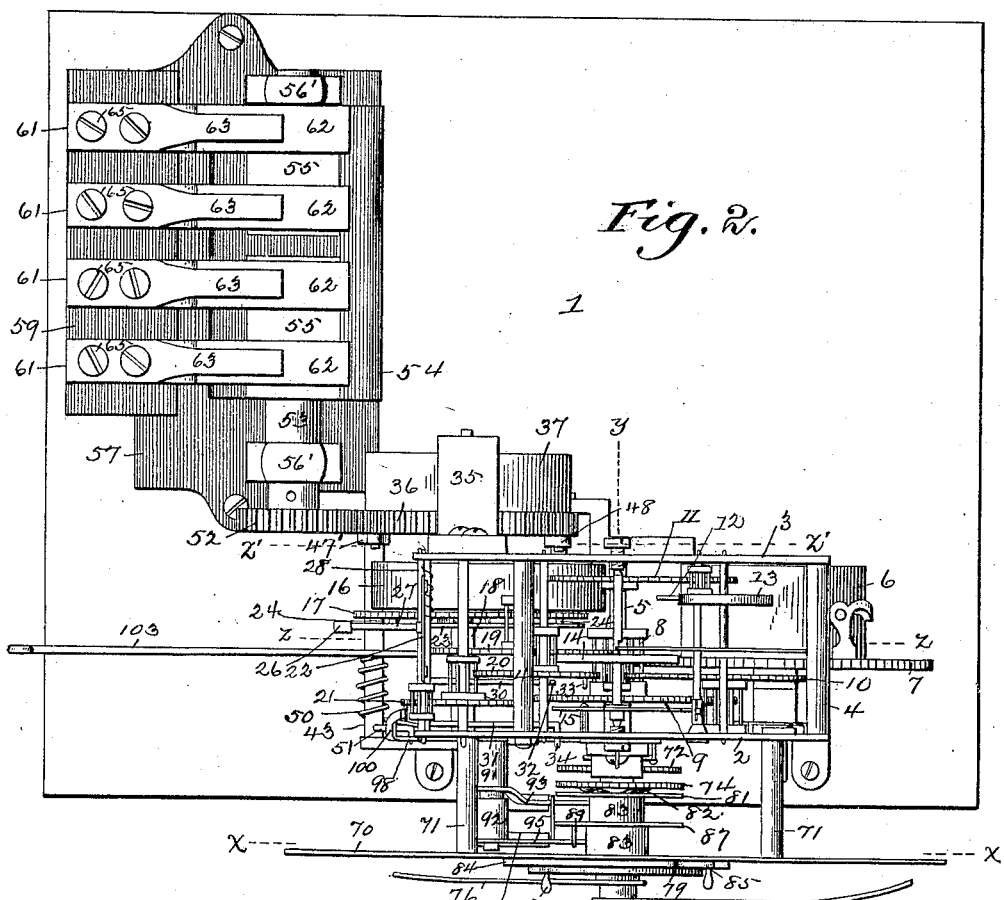
Figure 3:
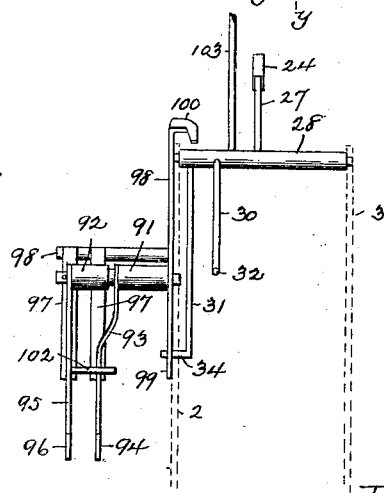
Figure 4:
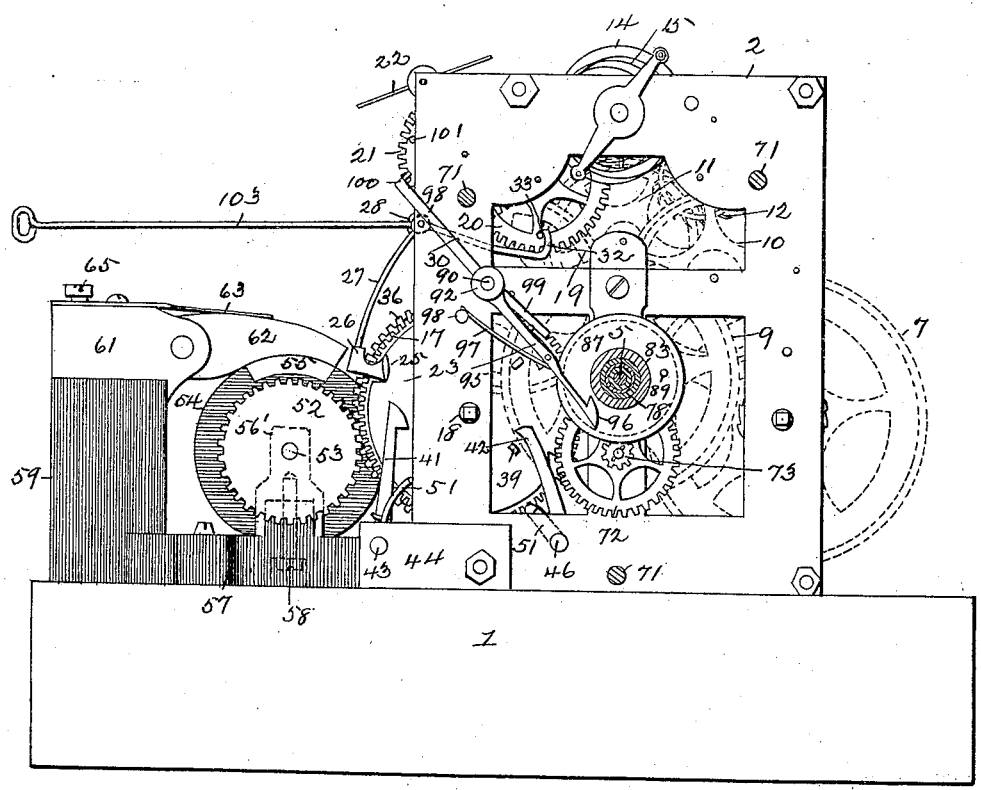
Figure 5:
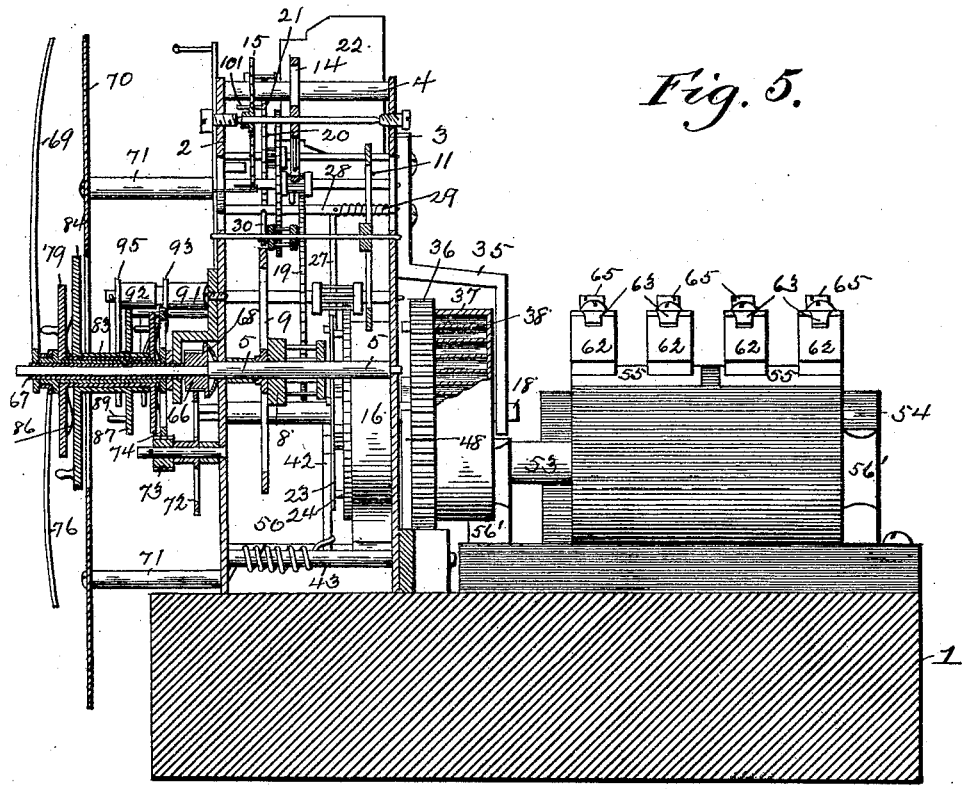
Figure 6:
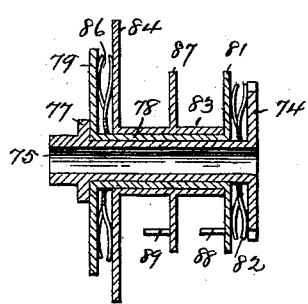
Figure 7:
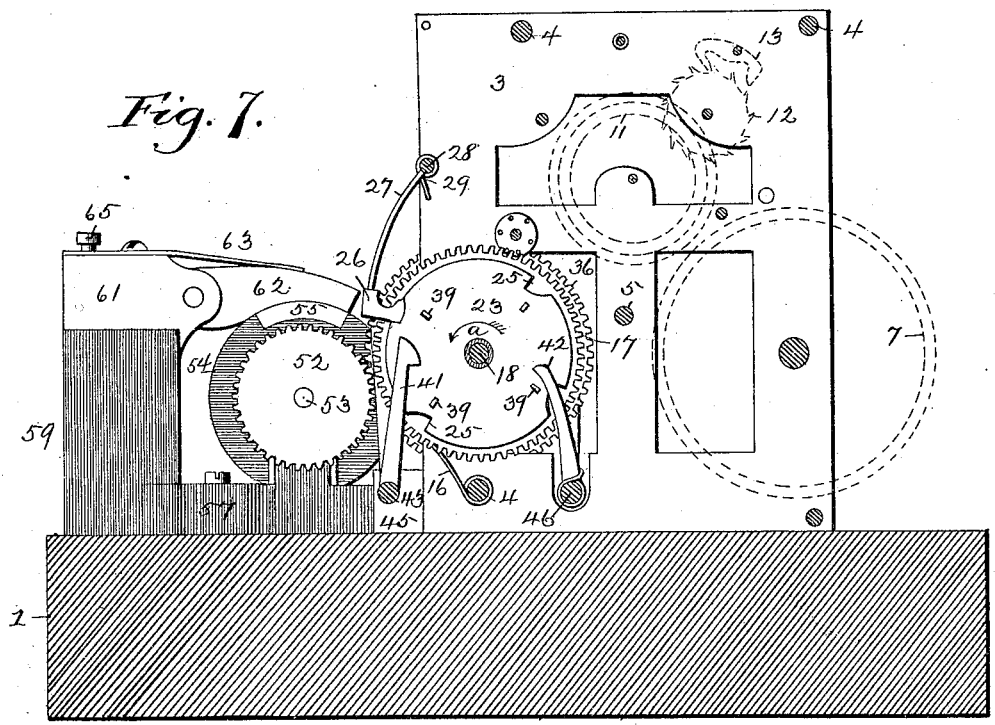
Figure 8:
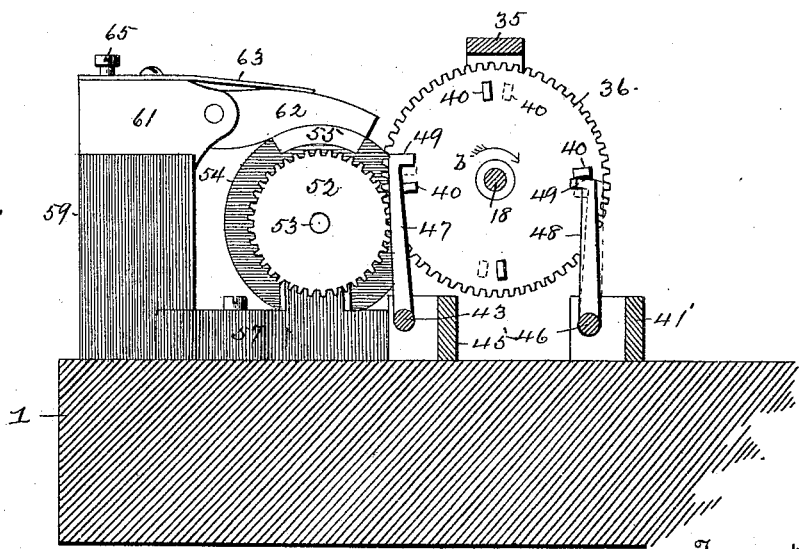
Figure 9:
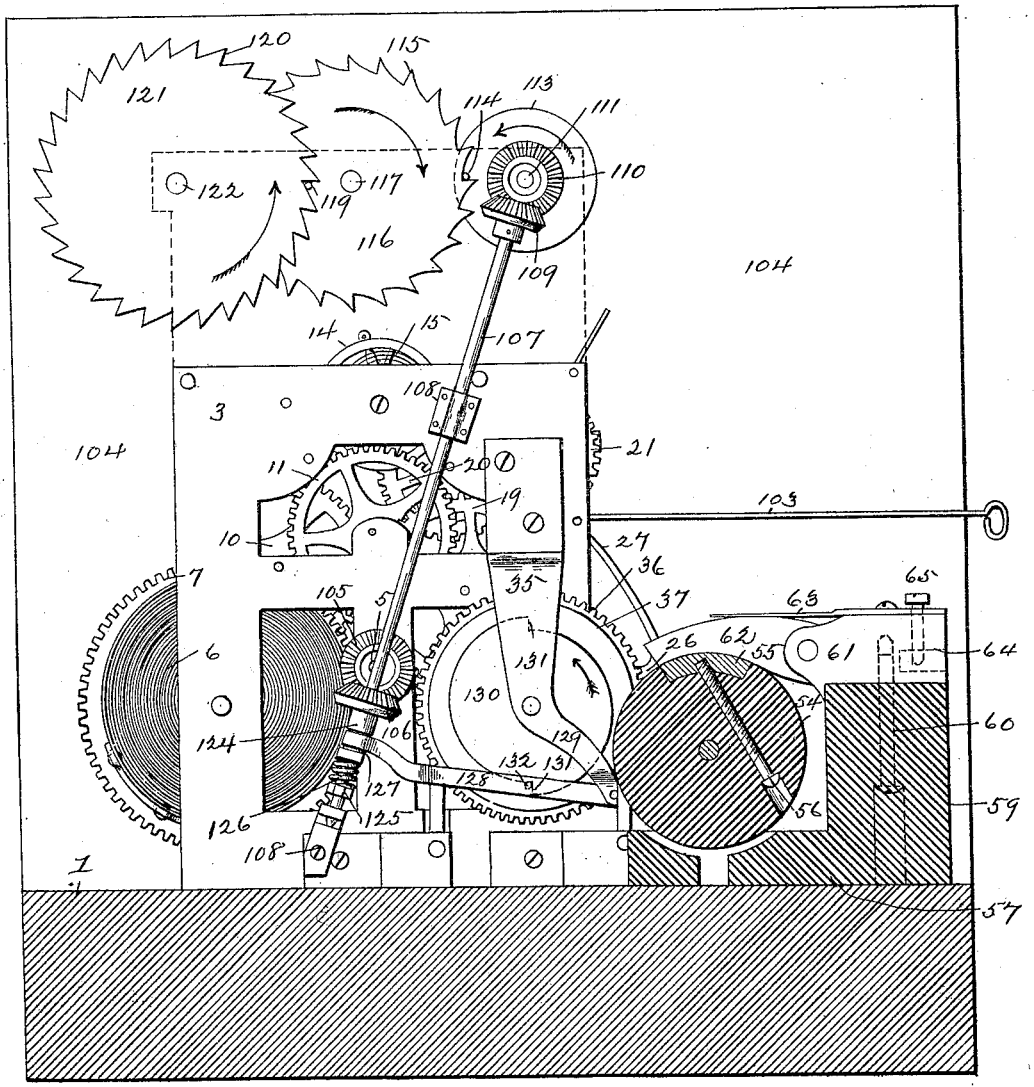
Figure 10:
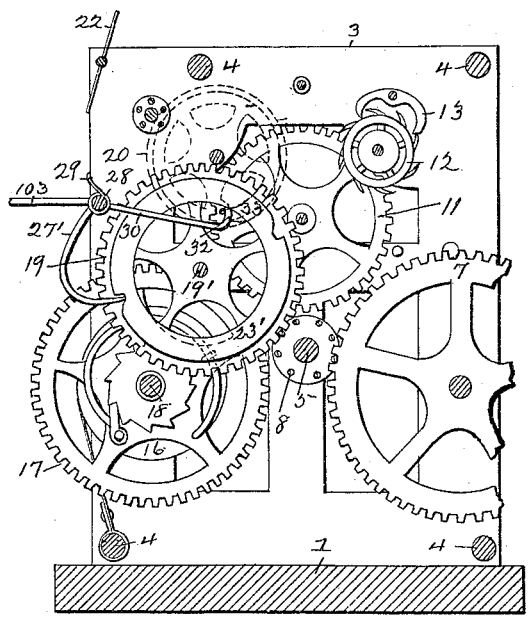
Figure 11:
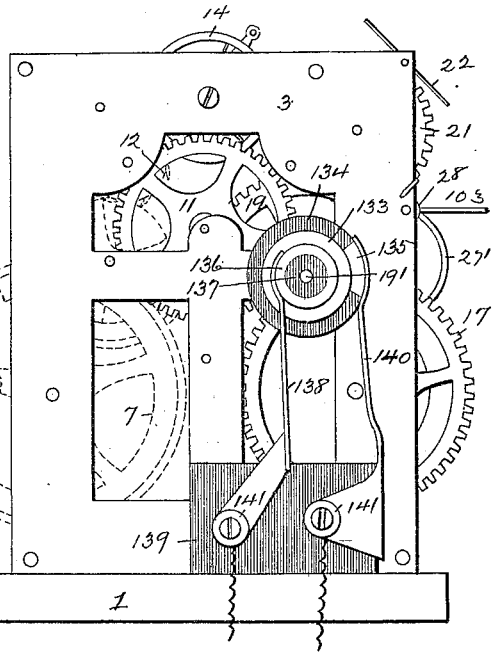
Figure 12:
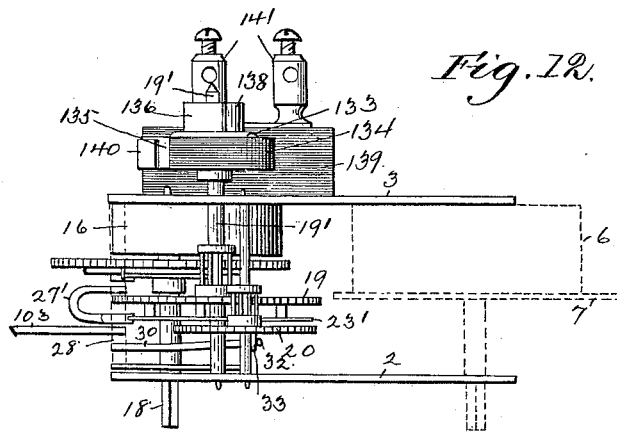

Figure 1 is a front or face view of a combined automatic electric time-switch and meter embodying my invention. Fig. 2 is a top plan view of the time-switch with the meter mechanism and casing removed. Fig. 3 is a view of a detail of construction. Fig. 4 is a vertical section on the line $x\ x$ of Fig. 2. Fig. 5 is a vertical section on the line $y\ y$ of Fig. 2. Fig. 6 is a longitudinal section of certain sleeves used in the time-switch mechanism. Fig. 7 is a vertical section on the line $z\ z$ of Fig. 2, showing a portion of the switch-controlling mechanism. Fig. 8 is a similar section on the line $z'\ z'$ of Fig. 2. Fig. 9 is a rear elevation of the combined automatic time-switch and meter with the electric switch in vertical section. Fig. 10 is a vertical section of a modified form of the switch and operating mechanism. Fig. 11 is a rear elevation of the same, and Fig. 12 is a plan view of the same.

Like numerals of reference indicate like parts throughout all the drawings.

In the drawings the switch-operating mechanism shown is similar to that of an ordinary striking-clock so modified as to operate in a manner suitable for the purposes of my invention. This clock mechanism is mounted on a suitable base 1 and consists of two sets of gearing, together with certain stop and let-off mechanisms, all of which are mounted in a frame composed of a face-plate 2 and back plate 3, connected by pillars 4.

Journaled in the frame is the main or hand-carrying arbor 5 of the clockworks, which arbor is driven by a spiral spring 6, located at one side of the frame and connected to the said arbor by means of a gear 7 meshing with a pinion 8 thereon in the usual manner. A gear 9 on the arbor 5 drives a train of gearing 10 11, actuating an escapement-wheel 12, which latter engages an anchor-pawl 13 and through it drives a balance-wheel 14, controlled by a hair-spring 15, all as in ordinary spring-driven clocks. At the side of the frame opposite the spring 6 there is another spiral spring 16, driving a gear 17 on an arbor 18, the said gear 17 driving a train of gears 19, 20, and 21, the last-named gear driving a fan 22, all as in the ordinary striking-movement of a clock.

On the face of the gear 17 there is secured a disk 23 by means of short pillars 24. In the periphery of the disk 23 there are four equidistant notches 25, (see Fig. 7,) shaped, as shown, to receive a head 26, carried at the end of an arm 27, coming from a rock-shaft 28, journaled in the frame of the clock-movements and having on it a helical spring 29, the tendency of which latter is to turn the rock-shaft 28 in a direction to hold the head 26 in a notch 25. The rock-shaft 28 is provided with two other arms 30 31, (see Fig. 3,) the arm 30 having its free end upturned, as shown at 32, and normally in the path of a pin 33, projecting from one side of the gear 20, before referred to. (See Fig. 4.) The other arm 31 has its free end 34 bent at right angles, so as to project into the path of certain mechanism, hereinafter described, by means of which the time-indicating clock-movement is made to control the striking-clock movement. It will be understood that if the arm 31 is moved in a direction to carry the end 32 of the arm 30 out of the path of the pin 33 on the gear 20, which movement will also lift the head 26 out of the notch 25 in which it is seated, the clock-movement under the control of the spring 16 will begin to operate. When now the disk 23 turns, the head 26 will ride on its periphery, thereby preventing the end 32 of the arm 30 from coming into the path of the pin 33 until another notch 25 is brought under the head 26, when the latter will fall into the said notch, again bringing the arm 30 into a position where its end 32 is in the path of the pin 33, thus stopping striking-movement.

The arbor 18 projects through the rear plate 3, and has a journal-bearing in a bracket 35, secured to said rear plate. Loosely mounted on the arbor 18, between the rear plate and the bracket 35, there is a large gear 36, having a spring-drum 37 formed on its rear face, and which is connected to said arbor by means of a spiral spring 38, Fig. 5, housed in said drum. The spring 16 is secured at one end to the arbor 18 and at the other end to one of the pillars 4, as shown in Fig. 7, and tends to rotate the gear 17 and disk 23 in the direction of the arrow $a$, Fig. 7, while the spring 38 tends to rotate the gear 36 in the direction of the arrow $b$, Fig. 8; but the arrangement is such that on turning the arbor 18 to wind up the spring 16 in the usual manner the spring 38 will also be wound up, and these springs are so proportioned that they will be wound up and will unwind to the same extent.

Projecting from the face of the disk 23, near its periphery, are four equidistant pins 39, and projecting from the face of the gear 36, near its periphery, are four equidistant studs 40. In the path of the pins 39 are two arms 41 42, the arm 41 rising from a rock-shaft 43, near the front end of the latter, the said rock-shaft being journaled in brackets 44 45, attached to the front plate 2 and rear plate 3, respectively. The arm 42 rises from a rock-shaft 46, near the front end of the latter, the said rock-shaft being journaled in the front plate 2, and extending through the rear plate is journaled in a bracket 47', secured to the latter. The two arms 41 42 are on opposite sides of the arbor 18, and their ends are so shaped that the pins 39, coming in contact with said ends, will force the upper ends of the arms 41 42 outwardly until out of the path of said pins. The arm 42 is shorter than the arm 41, so that one of the pins 39 will engage and force the arm out of its path an instant before another pin will engage the arm 41, the purpose of which will presently appear.

Rising from the rock-shaft 43, near its rear end, there is an arm 47, and rising from near the rear end of the rock-shaft 46 there is an arm 48, the upper ends 49 of both arms being bent inwardly at right angles. The arm 48 is shorter than the arm 47, and normally one of the studs 40 engages the upper surface of the end 49 of this arm 48, and thereby prevents the gear 36 from turning under the influence of the spring 38. Each rock-shaft 43 46 is urged toward the other by a helical spring 50, Figs. 2 and 5, and is provided with a stop-arm 51, Fig. 4, engaging the front plate 2 and limiting the inward movement of the arms carried by these rock-shafts. When the disk 23 rotates, one of the pins 39 engages the arm 42, moving the latter outwardly, thus rocking the shaft 46 in its bearings, and thereby moving the arm 48, with its head 49, out of the path of the stud 40, with which it happens to be in engagement. The gear 36 is thus released and is rotated by the spring 38 until another of the studs 40 engages under the end 49 of the arm 47. The pin 39 having by this time passed beyond the arm 42, the latter, together with the arm 48, are returned by the spring 50 on the rock-shaft 46 to their normal positions. Another pin 39 now engages the upper end of the arm 41 and forces it outward, thereby causing the arm 47 to move from out of the path of the stud 40, which at that time engages under its head. The gear 36 is now again released and rotated by the spring 38 until another stud 40 comes in contact with the upper end of the arm 48. The gear 36 meshes with a pinion 52, fixed to a shaft 53, which carries a cylinder 54 of insulting material. In the surface of this cylinder are seated contact-blocks 55, held in place by screws 56. (Shown in Fig. 9.) The shaft 53 is journaled in pillar-blocks 56', secured upon an insulating base-plate 57 by screws 58, or otherwise. The base-plate 57 is secured to the base 1, and at one side of the cylinder 54 there is formed on this base-plate and integral therewith a block 59. On the upper end of this block 59 there are secured by screws 60, Fig. 9, a number of metallic blocks 61, insulated from each other and having brush-blocks 62 pivoted to their overhanging ends. The under faces of the brush-blocks are curved to conform to the surface of the cylinder 54. They are forced against the cylinder-surface by springs 63, secured to the blocks 61. In the outer ends of these blocks 61 are formed sockets 64 for the reception of the bared ends of electrical leading-conductors, and entering each socket is a binding-screw 65. The brushes 62 are so disposed and the width of the blocks 55 is such that two brushes are bridged by each block. This device constitutes a rotary electric switch. In the drawings four brushes and two contact-blocks are shown; but in some cases only one pair of brushes may be used with but one contact-block on the cylinder, or several pairs of brushes, together with a corresponding number of contact-blocks, may be used, each pair of brush-blocks forming the terminals of a separate electric circuit, whereby a single switch may control a number of separate circuits simultaneously.

The proportion between the gear 36 and the pinion 52 is such that a quarter-revolution of the gear 36 will effect a half-revolution of the pinion 52 and cylinder 54, so that when the contact-blocks 55 are under the brushes 63 a quarter-revolution of the gear 36, carrying the cylinder 54, through a half-revolution will cause these blocks to assume a position diametrically opposite their first position, and the brushes will then rest on the insulating material of the cylinder 54, thus breaking the circuit. The next quarter-revolution of the gear 36 will again carry the contact-blocks under the brushes and thereby establish the circuit. It will thus be seen from the foregoing description that it is only necessary to release the striking-movement used in this device at a predetermined time in order to close the circuit, and to again release it at another predetermined time in order to break the circuit, and that by effecting this predetermined release of the striking-movement by the time-indicating movement the mechanism will continue to operate without attention so long as the springs operating the two movements do not become entirely unwound. Therefore, no further attention is required than to occasionally wind these springs. In the drawings the two clock-movements are not shown as adapted to run any special length of time, but in practice an ordinary thirty-day movement is the one preferred.

The mechanism by means of which the device may be set to operate the switch at the desired times to close and open the electric circuit is shown in Figs. 1 to 6, inclusive.

The main arbor 5 of the clock-movement carries the usual pinion 66 with its sleeve 67, both of which are loose upon the arbor and receive motion therefrom by a friction-spring 68, all as shown in Fig. 5. The sleeve 67 carries at its outer end the hour-hand 69, outside the dial-plate 70, which latter is secured to the front plate 2 by means of pillars 71. The pinion 66 drives the usual speed-reducing gear 72 and pinion 73, by which motion is transmitted to a gear 74, fast on the rear end of a sleeve 75, carrying at its front end the hour-hand 76. This hand-actuating mechanism is the same as in an ordinary clock, except that the sleeves 67 and 75 are more extended, so that the dial-plate 70 may be set a sufficient distance in front of the clock-frame to permit the introduction between them of setting mechanism, by means of which the switch-actuating devices are released at the proper time. Near its front end the sleeve 75 has formed on it an annular flange 77, between which and the gear 74 the sleeve 75 carries another sleeve 78, with its front end formed into a disk 79, provided on one side with a handle 80, and having on its face a circular index preferably divided into twenty-four full-hour divisions and with the appropriate numerals. The rear end of the sleeve 78 is formed into an annular flange 81, between which and the gear 74 there is confined a friction-disk 82, provided with a number of spring-fingers engaging the opposing faces of the gear 74 and disk 81, thereby forcing the sleeve 78 with the disk 79 against the annular flange 77 of the sleeve 75. This friction-disk 82 has sufficient friction-bearing on the gear 74 and flange 81 to cause the sleeve 78 to rotate with the sleeve 75; but at the same time the said sleeve 78 may be turned on the sleeve 75 by a suitable manipulation of the handle 80. On the sleeve 78 there is another and shorter sleeve 83 confined between the flange 81, with which its rear end engages, and the disk 79. This sleeve 83 has formed on its front end a disk 84, larger than the disk 79, and also provided with a handle 85, and a like index of twenty-four hour-divisions with the appropriate numerals. Between the disks 79 and 84 there is confined a friction-disk 86, causing the two disks to revolve together, but permitting them to be moved around their axis independently by the proper manipulation of the handles 80 and 85. About midway of the sleeve 83 there is formed an annular flange 87, similar to the flange 81 of the sleeve 78. The flange 81 has fixed to it a pin 88, and the flange 87 has a similar pin 89, each pin projecting from the respective flange at right angles thereto.

Projecting from the front plate 2 of the clockworks there is a fixed pin 90, on which are journaled two hubs 91 92. The hub 91 has an arm 93 projecting laterally from its front end, and has a cam-shaped head 94 projecting into the path of the pin 88 on the flange 81, and the hub 92 has a similar arm 95 projecting from its front end and provided with a cam-shaped head 96 in the path of the pin 89 on the flange 87. Both arms 93 95 are held in the paths of the pins 88 and 89, respectively, by means of flat springs 97, secured to a pin 98′ projecting from the front plate 2 of the clockworks-frame. On the rear end of the hub 91 there are two oppositely-projecting fingers 98 99, the finger 98 terminating in an angle-piece 100, which when the hub is turned on its bearings projects into the path of a pin 101 on the face of the gear 21, Figs. 2 and 4, and the finger 99, bearing on the end 34 of the arm 31, projecting from the rock-shaft 28. The arm 95 is provided with a pin 102, projecting over the arm 93 in such manner that as the arm 95 is moved against the action of its spring 97 the arm 93 will participate in such movement, while at the same time the said arm 93 may be moved independently of the arm 95.

In a clock in which the hour-hand makes one revolution in twenty-four hours the setting mechanism is operated as follows: Assuming that the mechanism is to be set to turn on the current to the lamps at four p. m. and to turn off the current from the lamps at ten p. m., the smaller disk 79 is turned until the numeral "16" thereon is directly under the hour-hand of the clock, wherever the said hour-hand may be pointed at that particular time, and the larger disk 84 is turned so that the number "22" thereon is also directly under the hour-hand. As the hour-hand progresses, the two disks and the sleeves of which they form a part will move with the said hour-hand. Shortly before the hour-hand has reached sixteen o'clock (four p. m.) the pin 88 is brought into engagement with the cam-head 94 of the arm 93, and as it advances along the same it forces the arm out of its path, thereby rocking the hub 91, so that the arm 99 on the latter will move the arm 31 of the rock-shaft 28, turning the latter sufficiently to carry the end 32 of its arm 30 out of the path of the pin 33 on the gear 20. At the same time the angle-piece 100 on the arm 98 is moved into the path of the pin 101 on the gear 21, but not until the gear 20 has moved far enough to carry the pin 33 beyond the end of the arm 30. When the hour-hand has finally reached the numeral "16" on the dial-plate, the pin 88 escapes from the head 94, allowing the arm 93 to be returned to its normal position by its spring 97, thus releasing the gear 21. The train of gear driven by the spring 16 continues to move, since the head 26 on the arm 27, having been lifted from the notch 25 in which it rested and bearing on the periphery of the disk 23, holds the arm 30 with its end 32 out of the path of the pin 33 on the gear 20 until the said head falls into the next succeeding notch 25, thereby again bringing the end of the arm 30 in the path of the pin 33. As has been before explained, the striking-movement when released rotates the movable part of the switch until the contact-blocks 55 complete the circuit between the brushes 62. When the hour-hand reaches the numeral "22," (ten p. m.,) the pin 89 moves the arm 95, and the latter by means of the pin 102 moves the arm 93, and this, in the manner before explained, effects the release of the striking-movement and the switch is turned from the "on" position to the "off" position. It will now be understood that the lamp-circuit will be daily completed and broken at the times predetermined upon without any attention whatever further than to wind up the springs at intervals of, say, thirty days. The time of day at which the lamps are to be cut in or cut out may be changed at any time to suit the desire of the consumer by a suitable manipulation of the index-disks. In order to guide the person setting the mechanism, the index-disks 79 and 84 are preferably differently colored—for instance, the disk 79, controlling the mechanism by which the switch is moved to complete the circuit, may be white, while the other disk 84, by which the mechanism is set to break the circuit, may be dark or black, as indicated by appropriate shading in Fig. 1. It may be desirable to be able to establish or break the circuit at other times than those for which the mechanism is set without disturbing the setting mechanism. For this purpose a rod 103, projecting from the rock-shaft 28, is provided, so that the said shaft may be manipulated to release the switch-controlling movement at any time.

The entire device is inclosed in a suitable case 104, and the rod 103 projects beyond the said casing, so as to be easily manipulated.

The automatic electric time-switch combined with the meter, which will presently be described, is particularly adapted for use by supply companies as a check on consumers, in which case the setting mechanism and the winding of the spring will be under the control of the company, the entire device being so inclosed that while the face may be inspected the consumer will have no access thereto, except by the rod 103.

The meter is combined with and operates in conjunction with the automatic electric time-switch. The details of this meter are shown in Fig. 9. The main arbor 5 is continued beyond the rear plate 3, and there carries a beveled pinion 105, meshing with a beveled pinion 106 on a shaft 107, journaled in brackets 108, carried by the rear plate 3, and continued upward beyond the top of the clock-frame. At its upper end this shaft carries a beveled pinion 109, meshing with a beveled pinion 110 on an arbor 111, journaled in a suitable frame (shown by dotted lines) and attached to the clock-frame. This arbor projects through the front of the casing 104, where it carries a pointer 112, Fig. 1.

On the shaft 111 is a disk 113, having near its periphery a pin 114, in the path of which are the teeth 115 on the periphery of a disk or wheel 116, carried by a shaft 117, which latter is suitably journaled in the frame before mentioned and projects through the front of the casing 104, and there carries a pointer 118. At one side of the shaft 117 the disk 116 carries a pin 119, in the path of which are teeth 120 on a disk or wheel 121, mounted on a shaft 122, also suitably journaled in the before-mentioned frame and projecting beyond the front of the case 104, and there carrying a pointer 123. The gearing 105, 106, 109, and 110 are so proportioned that the disk 113 will make one revolution per hour, and at each revolution this disk will move the disk 116 a distance equal to the space of one tooth. On the disk 116 are twenty-four teeth. Consequently the disk 116 will make one revolution to twenty-four revolutions of the disk 113. The disk 121 has thirty teeth and is moved the space of one tooth each time the disk 116 makes a complete revolution.

The pointer 112 is provided with a dial having four divisions indicating fifteen minutes each. The pointer 118 is provided with a dial having twenty-four divisions indicating one hour each, and the pointer 123 is provided with a dial having thirty divisions each representing twenty-four hours, or one day. This meter is intended to be used in connection with a certain definite number of lamps, so that on reading the dials they will indicate that this certain number of lamps has been burning a certain number of days, hours, and quarter-hours during a month of thirty days, and it is an easy matter to then compute the current consumed.

In order to have the meter operate only when the lamp-circuit is closed, the beveled gear 106 is splined to the shaft 107, so that, while rotating with it, it may be moved longitudinally thereon, and between a hub 124, formed on said gear, and a nut or flange 125, fixed on the shaft 107, is a spiral spring 126, tending to maintain the gear 106 in engagement with gear 105. In the hub 124 is formed an annular groove 127, in which engages one end of a lever 128, the other end being pivoted to an extension 129 of the bracket 35. On the rear face of the spring-drum 37 is formed a double cam 130, the faces of each of which end in abrupt shoulders 131 diametrically opposite. On the lever 128 is secured a pin 132 in the path of the two faces of the cam 130.

As before explained, the gear 36 moves a quarter-revolution in order to close the circuit at the switch and then a quarter-revolution to open the same, and the next quarter-revolution again closes the switch and the fourth quarter-revolution again opens it, so that at each half-revolution the switch is closed. The shoulders 131 are so arranged that at this point the pin 132 will pass from the top of one cam, in which position the gears 105 and 106 are forced apart, and will be carried by the spring 126 to the beginning of the next cam-face, and thereby bring the gear 106 into engagement with the gear 105. Thus when the switch is closed the meter is coupled to the time-movement of the clockworks and therefore registers. The next quarter-revolution of the gear 36 actuates the switch to open the circuit, and at the same time the cam 130 is rotated a quarter-revolution, thereby actuating the lever 131 to force the gear 106 away from the gear 105 and thereby stopping the meter.

In Figs. 10, 11, and 12 there is shown a switch adapted more particularly for circuits containing a small number of lamps. In these views the setting and let-off mechanisms are omitted, since they are identical with those already described. The rotary switch is carried on a rearward extension of the arbor 19', carrying the gear-wheel 19 of the striking-movement. The gear 19 carries an annulus 23', having in its periphery two diametrically-opposite notches 25', in the path of an arm 27', coming from the rock-shaft 28, the arrangement being such that the gear 19, together with the rotary switch, will make a half-revolution each time the let-off mechanism is operated. The rotary switch is composed of a metallic cylinder 133, having an insulating-covering 134, except at one side, where the cylinder is provided with a radial extension or contact-block 135, having its outer face flush with the outer surface of the insulating-covering, and projecting from one side of the cylinder 133 there is a metallic hub or collecting-ring 136, formed integral with the said cylinder 133. The metallic portions of the rotary switch are insulated from the arbor by an insulating-sleeve 137. A brush 138, secured at the lower end to an insulating-block 139, fast on the base 1, bears with its upper end on the collecting-ring 136, and another brush 140, also secured to the block 139, bears with its upper end on the periphery of the rotary switch. When the contact-block 135 is under the brush 140, the circuit through the switch is closed through the cylinder 133 and collecting-ring 136, and when the switch is rotated through a half-revolution the circuit is broken. Binding-posts 141 are connected to the brushes for receiving the ends of leading-wires.

Having thus fully described my invention, I claim and desire to secure by Letters Patent—

1. An automatic electric time switch consisting of a rotary switch for closing and opening an electric circuit, a spring motor for rotating the switch, a lock for the switch motor, a time piece, setting mechanism controlled by the time piece and connections between the setting mechanism and switch-motor lock whereby the time piece will operate to release the switch motor at predetermined changeable times, substantially as described.

2. An automatic electric time switch consisting of a rotary switch for closing and opening an electric circuit, a spring motor for rotating the switch, trip mechanism limiting the movement of and locking the switch motor, a time piece, setting mechanism controlled by the time piece, and connections between the setting and trip mechanism, whereby the time piece will operate to release the switch motor at predetermined changeable times, substantially as described.

3. An automatic electric time switch consisting of a rotary switch for closing and opening an electric circuit, a spring motor for rotating the switch, a spring actuated trip mechanism for the switch motor, a time piece, setting mechanism controlled by the time piece and connections between the setting and trip mechanisms, whereby the time piece will operate to release the switch motor at predetermined changeable times, substantially as described.

4. An automatic electric time switch consisting of a switch for closing and opening an electric circuit, a motor for the switch, a lock for the switch motor, a spring driven striking movement for actuating the lock, a time piece, a setting mechanism controlled by the time piece, and connections between the setting mechanism and striking movement whereby the time piece will operate to release the switch motor at predetermined changeable times, substantially as described.

5. An automatic electric time switch consisting of a switch for closing and opening an electric circuit, a spring motor geared to the switch for rotating the same, a lock for the switch motor, another spring motor for actuating the lock, a time piece, setting mechanism controlled by the time piece and stop mechanism for the lock motor controlled by the setting mechanism, substantially as described.

6. An automatic electric time switch, consisting of a circuit closing and opening switch, a spring motor for the same, a lock for the switch motor, another spring motor for the lock, with its spring on the same winding arbor as the spring of the switch motor, and a time piece controlling the lock motor for releasing the switch motor at predetermined changeable times, substantially as described.

7. An automatic electric time switch, consisting essentially of a time-piece, a circuit closing and opening switch, an actuating mechanism for the same, operating both to open and to close the switch independently of the driving mechanism of the time-piece and two setting mechanisms both carried by the main or hand arbor of the time piece, and operating to release the said actuating mechanism at successive predetermined and changeable times, substantially as described.

8. An automatic electric time switch consisting essentially of a circuit closing and opening switch, a spring motor for the same, a spring driven striking movement controlling the switch-motor, with a common winding arbor to the springs of both the motor and striking movement, and a time-piece and connections for controlling the striking movement to release the switch motor at predetermined changeable times, substantially as described.

9. The combination with an automatic electric time switch, comprising a circuit closing and opening device, an actuating mechanism for the same, and a time piece controlling the said actuating mechanism at predetermined times, of a meter, and connections between the latter and the time piece, controlled by the mechanism driving the circuit closing and opening device, whereby the time piece is coupled with and actuates the meter when the circuit is closed and is uncoupled therefrom when the circuit is opened, substantially as described.

In testimony whereof I have signed my name to this specification in the presence of two subscribing witnesses.

JAMES F. McLAUGHLIN.

Witnesses:
MICHAEL G. PLUNKETT,
H. F. REARDON.